(12) United States Patent
Nguyen et al.

(10) Patent No.: US 11,994,247 B2
(45) Date of Patent: May 28, 2024

(54) QUICK CONNECTOR FOR END-TO-END COUPLING OF INDUSTRIAL CONDUIT SECTIONS

(71) Applicant: AXXIOM MANUFACTURING, INC., Fresno, TX (US)

(72) Inventors: Phuong Taylor Nguyen, Richmond, TX (US); Antony Rodriguez, Rosenberg, TX (US)

(73) Assignee: Axxiom Manufacturing, Inc., Fresno, TX (US)

( * ) Notice: Subject to any disclaimer, the term of this patent is extended or adjusted under 35 U.S.C. 154(b) by 169 days.

(21) Appl. No.: 16/271,872

(22) Filed: Feb. 10, 2019

(65) Prior Publication Data

US 2023/0084846 A1 Mar. 16, 2023

(51) Int. Cl.
| | |
|---|---|
| *F16L 33/22* | (2006.01) |
| *F16L 37/092* | (2006.01) |
| *F16L 37/10* | (2006.01) |
| *F16L 37/20* | (2006.01) |

(52) U.S. Cl.
CPC ........... *F16L 37/105* (2013.01); *F16L 33/224* (2013.01); *F16L 37/0925* (2013.01); *F16L 37/101* (2013.01); *F16L 37/20* (2013.01)

(58) Field of Classification Search
CPC ..... F16L 33/223; F16L 33/224; F16L 19/083; F16B 39/36; F16B 37/16
USPC .................................. 411/265–268, 270, 409
See application file for complete search history.

(56) References Cited

U.S. PATENT DOCUMENTS

| | | | | |
|---|---|---|---|---|
| 418,906 | A * | 1/1890 | Bosworth | F16L 33/224 285/259 |
| 1,113,770 | A * | 10/1914 | Gabrohn | F16L 33/224 285/259 |
| 2,116,299 | A * | 5/1938 | Bannister | F16L 33/224 285/249 |
| 2,147,353 | A * | 2/1939 | Scholtes | F16L 33/224 285/248 |
| 3,980,325 | A * | 9/1976 | Robertson | F16L 33/224 285/382.7 |
| 4,900,068 | A * | 2/1990 | Law | F16L 33/224 285/139.2 |
| 5,558,375 | A * | 9/1996 | Newman | F16L 33/224 285/23 |
| 2004/0217589 | A1 * | 11/2004 | Mittersteiner | F16L 33/224 285/322 |

FOREIGN PATENT DOCUMENTS

| | | | | |
|---|---|---|---|---|
| DE | 202012101020 U1 * | 8/2012 | ............ | F16L 33/224 |
| EP | 0168260 A2 * | 1/1986 | ............ | F16L 33/224 |
| EP | 1612467 A2 * | 1/2006 | ............ | F16L 19/083 |

(Continued)

*Primary Examiner* — Matthew Troutman
*Assistant Examiner* — Fannie C Kee
(74) *Attorney, Agent, or Firm* — Kearney, McWilliams & Davis, PLLC; John M. DeBoer

(57) ABSTRACT

A compression-type fitting system for quick connection of two conduits. The system includes a compression body configured to receive a first conduit and a second conduit therein. The system includes a compression lock nut to engage an outer surface of the compression body. Upon tightening, a continuous ring within the compression body facilitates forming a seal between the compression body and the first conduit.

17 Claims, 5 Drawing Sheets

(56) References Cited

FOREIGN PATENT DOCUMENTS

| GB | 2112483 A | * | 7/1983 | ............ | F16L 33/224 |
| JP | 2015048887 A | * | 3/2015 | ............ | F16L 33/224 |
| WO | WO-2013018542 A1 | * | 2/2013 | ............ | F16L 33/224 |

* cited by examiner

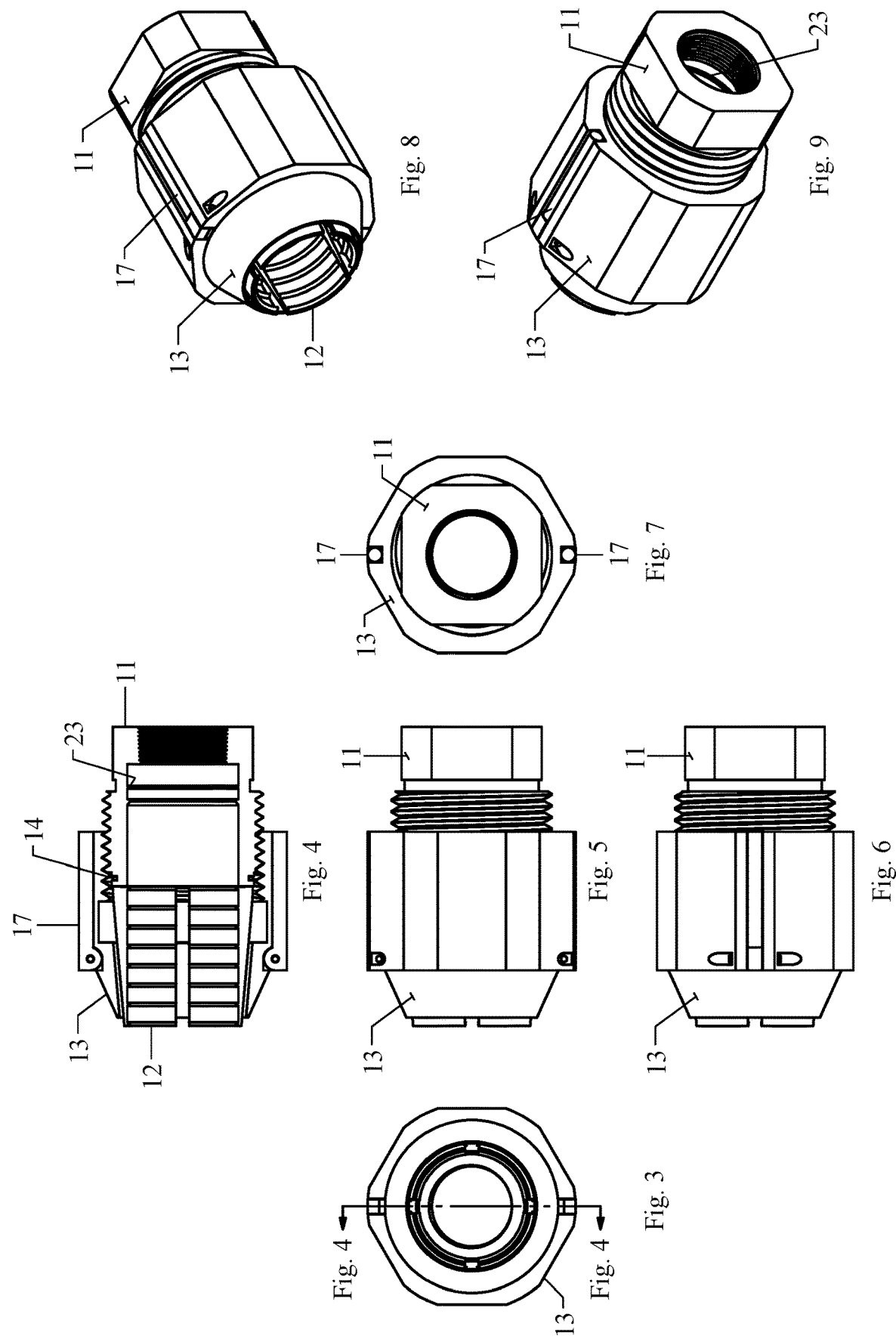

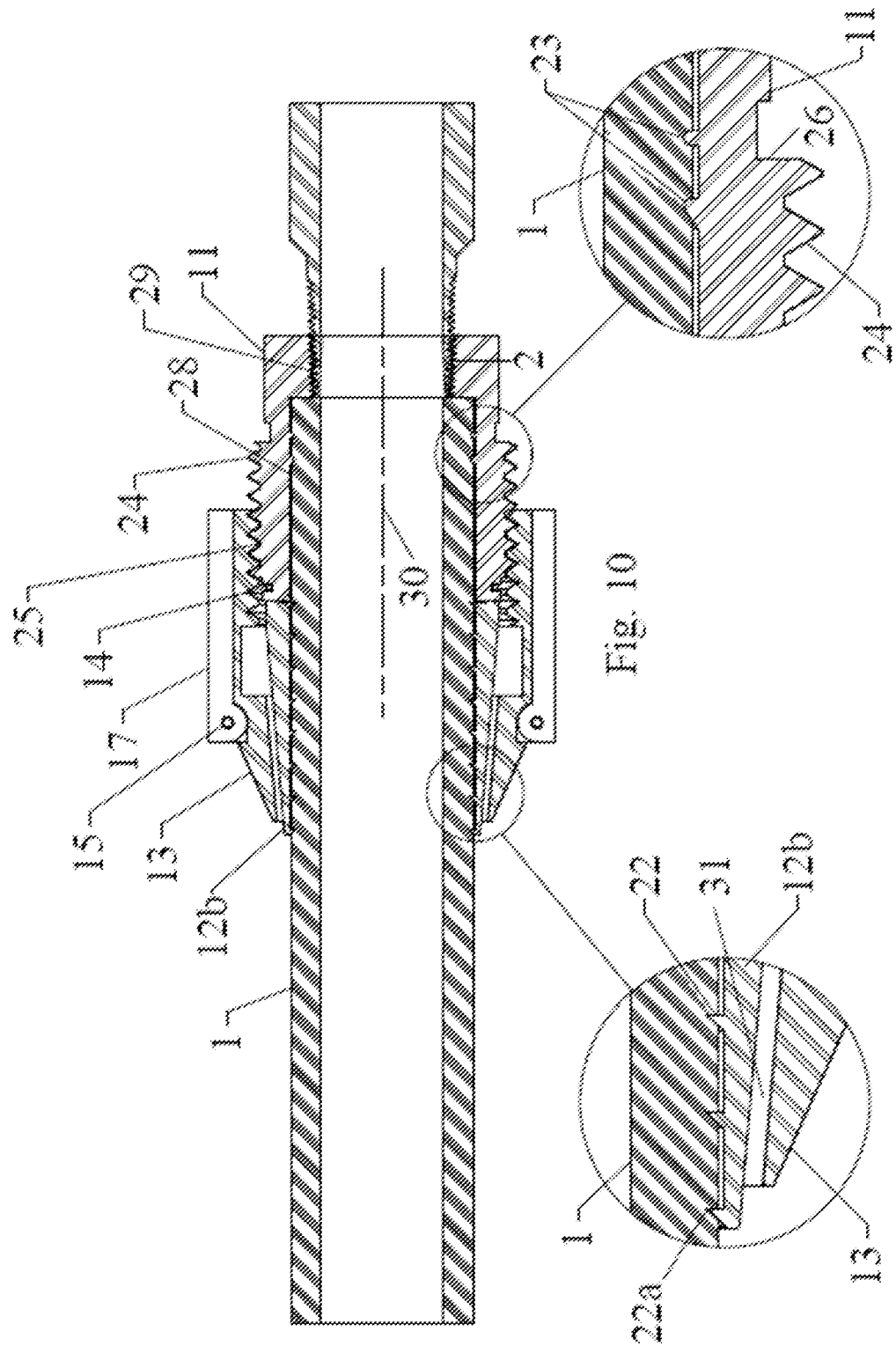

QUICK CONNECTOR FOR END-TO-END COUPLING OF INDUSTRIAL CONDUIT SECTIONS

BACKGROUND OF THE INVENTION

Field of the Invention

The invention is in the general field of connector couplings for connecting two ends a conduit such as a hose-to-hose or hose-to-pipe together and is specifically directed to compression-type connectors for industrial hoses.

Discussion of the Prior Art

It is well known to use a compression fitting to connect two pipes or a pipe to a fixture or valve. It typically consists of three parts: the compression nut, the ferrule or compression ring, and the compression seat.

In small sizes, the compression fitting is composed of an outer compression nut and an inner compression ring or ferrule typically made of brass or copper. Ferrules vary in shape and material but are most commonly in the shape of a ring with beveled edges. To work properly, the ferrule must be oriented correctly. Usually, the ferrule is fitted such that the longest sloping face of the ferrule faces away from the nut.

When the nut is tightened, the ferrule is compressed between the nut and the receiving fitting. The ends of the ferrule are clamped around the pipe, and the middle of the ferrule bows away from the pipe, making the ferrule effectively thicker. The result is that the ferrule seals the space between the pipe, nut, and receiving fitting, thereby forming a tight joint.

Larger sizes of compression fittings do not have a single nut to compress the ferrule but a flange with a ring of bolts that performs this task. The bolts have to be tightened evenly to assure a seal.

Thread sealants such as joint compounds are unnecessary on compression fitting threads, as it is not the thread that seals the joint but rather the compression of the ferrule between the nut and pipe.

While widely used, compression fittings have not been employed regularly in heavy duty couplings. It would be desirable to provide a compression-type system primarily applicable to heavy commercial applications such as media blast systems where the media is delivered under pressures up to 150 psi and higher. The subject invention fills that void.

SUMMARY OF THE INVENTION

The subject invention is a compression-type fitting for quick connection and disconnection of two conduits such as hoses or hose and pipe sections primarily used for industrial applications. Typically, such applications include heavy duty hoses typically in one to two inches in diameter, although not so limited. A commercial application for which the connector system has shown to be particularly useful is in the media blasting industry where ends to be end-to-end connected are subjected to extreme conditions and break or leak after a relatively short period of use, requiring frequent shut down and repair or replacement.

The subject invention is particularly suited for use in this and similar applications. It is easy to use, does not require any tools and decreases the change time to less than fifty percent of known connection systems. The system includes a compression body which is adapted to be placed on one end of a conduit such as a hose. A compression lock nut is placed around another end of a second conduit, such as another hose. The compression body includes a compression assembly which extends beyond compression body and is adapted to receive the conduit end carrying the compression lock nut. When the lock nut is tightened on the compression body, the compression assembly tightens around and engages the conduit to form a tight durable connection between the respective conduit ends.

A plurality or set of leaves or plates are utilized rather than a ferrule or compression ring. This replaces the ferrule and permits compression between the nut and the receiving fitting without having to compress or deform the compression component. The leaves are clamped around the conduit (e.g., pipe). The result is that the leaves tighten to form a seal in the space between the nut and the receiving fitting, forming a tight joint. An important feature of this design is the system can be use in repeated operations without any of the key components being deformed during each application.

The sharp internal ribs of each leaf function to grip the outside surface of the first conduit. The sealing is done by two internally raised continuous rings which contact the outside surface of the conduit to create two airtight seals. Generally two rings are used to create redundant seals.

A stowable compression handle system is carried on and stowed in the compression lock nut once the compression fitting is mounted on and secured to the hose assembly. In the preferred embodiment the handle system comprises a pair of dye pins or handles, each stowed in a nesting slot on the outer perimeter of the compression lock nut and extending parallel to the center line of the system. When in use to disconnect or connect the system to a pair of conduit ends, the handles or dye pins swing out so that they are perpendicular to the system center line for providing leverage for turning the compression lock nut.

In the preferred embodiment, the compression assembly is defined by a plurality of arcuate plates or leaves having a first plate end mounted on the compression body and a second plate end extending outward therefrom for surrounding the outer perimeter of the conduit portion. A compression lock nut is mounted to receive the compression body. The first plate ends are mounted in a channel provided on the compression body and a snap ring secures the leaves in place during assembly and disassembly.

In practice, one conduit end is inserted in the compression body end opposite the leaves. The compression nut is mounted on another conduit end and is engaged by the body. The nut is tightened and the leaves are compressed to couple the respective ends together. In addition, air pressure will exert natural force to pull or separate the conduit away from the body. As the conduit moves away from the body, the leaves which have a grip on the conduit will also move. The outside tapered surface of the shifting leaves will press against the inside taper of the nut causing the leaves to further tighten their grip on the conduit.

BRIEF DESCRIPTION OF THE DRAWINGS

FIGS. 3-9 are various views of the compression body and the compression lock nut.

FIGS. 10-12 are taken along a section at the center line of the system and show the engagement of the leaves with a conduit when the assembly is tightened.

DETAILED DESCRIPTION OF THE INVENTION

Figure 1:
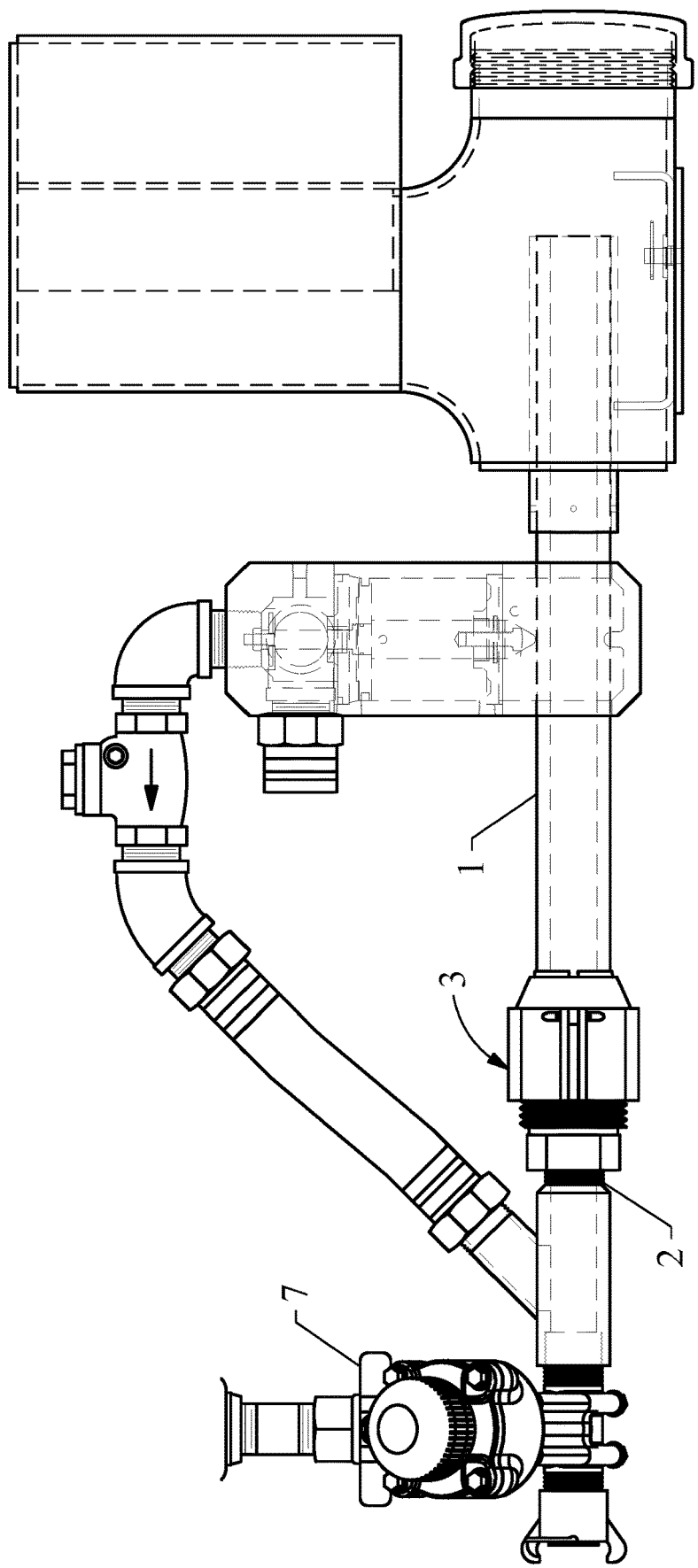
FIG. 1 is a diagrammatic illustration of a media blasting system with the quick connect system shown mounted up stream of the media valve.

The compression-type quick connect/disconnect system includes three main components, a compression body, a compression lock nut and a compression system. It is ideally suited for connecting two conduit ends together in a substantially leak-proof coupling.

The compression body has outer surface and an inner surface, wherein the inner surface defines a first receptacle for a first conduit. A compression lock nut is adapted to be secured to the outer surface of the compression body. A compression system is positioned between the compression body and the compression lock.

The compression system includes the compression plates having respective first plate ends secured to the compression body, and respective second plate ends extending outwardly from the compression body and adapted to engage a compression lock nut proximate the first conduit end. The compression system of the preferred embodiment is a plurality of plates or leaves free to move relative to one another, each element having one plate end attached to the compression body and another plate end adapted to be placed on the outer perimeter of the first conduit and the inner wall of a compression lock nut, whereby movement of the compression lock nut compresses each element to couple the two conduit ends together.

A limiting element is provided wherein each plate is restricted in the ability to move toward and away from the center axis of the compression body. The compression body includes a receptor for holding the ring and limiting the movement of each plate. A tool system is stowed in the compression body comprising a movable handle adapted to be stowed in the compression lock and movable between a stowed position and an operating position for facilitating tightening and loosening of the compression lock relative to the compression body.

For purposes of clarity, the reference numerals used in this application are as follows.

| Numeral | Component |
| --- | --- |
| 1 | First conduit (end) |
| 2 | Second conduit (end) |
| 3 | Quick connect/disconnect system |
| 4-6 | Not used |
| 7 | Metering valve |
| 8-10 | Not used |
| 11 | Compression body |
| 12 | Compression plates or leaves |
| 12a | First end of Compression plate |
| 12b | Second end of Compression plate |
| 13 | Compression Lock Nut |
| 14 | Snap ring |
| 15 | Dye pins |
| 16 | Dye pin washers |
| 17 | Swivel post for dye pin |
| 18 | Not used |
| 19 | Not used |
| 20 | Snap ring retaining slots |
| 21 | Face surface of compression body |
| 22 | Raised ribs on leaf inner surface |
| 22a | Sharp edge or ribs |
| 23 | Circular rings on the first receptacle |
| 24 | Threaded surface on compression body |
| 25 | Mated threads on the nut |
| 26 | Compression body outer surface |
| 27 | Swivel post housing groove |
| 28 | Compression body first receptacle |
| 29 | Compression body second receptacle |
| 30 | Compression body central axis |
| 31 | Compression lock nut inner surface |
| 32 | Outer plate surface (of plate 12) |
| 33 | Inner plate surface (of plate 12) |

With reference to FIG. 1, the quick connect/disconnect system 3 of the invention is shown as mounted on respective conduit ends 1 and 2 of a typical media blast system and located upstream of the metering valve 7. In exhaust mode the fitting is technically downstream of the metering valve.

Figure 2:
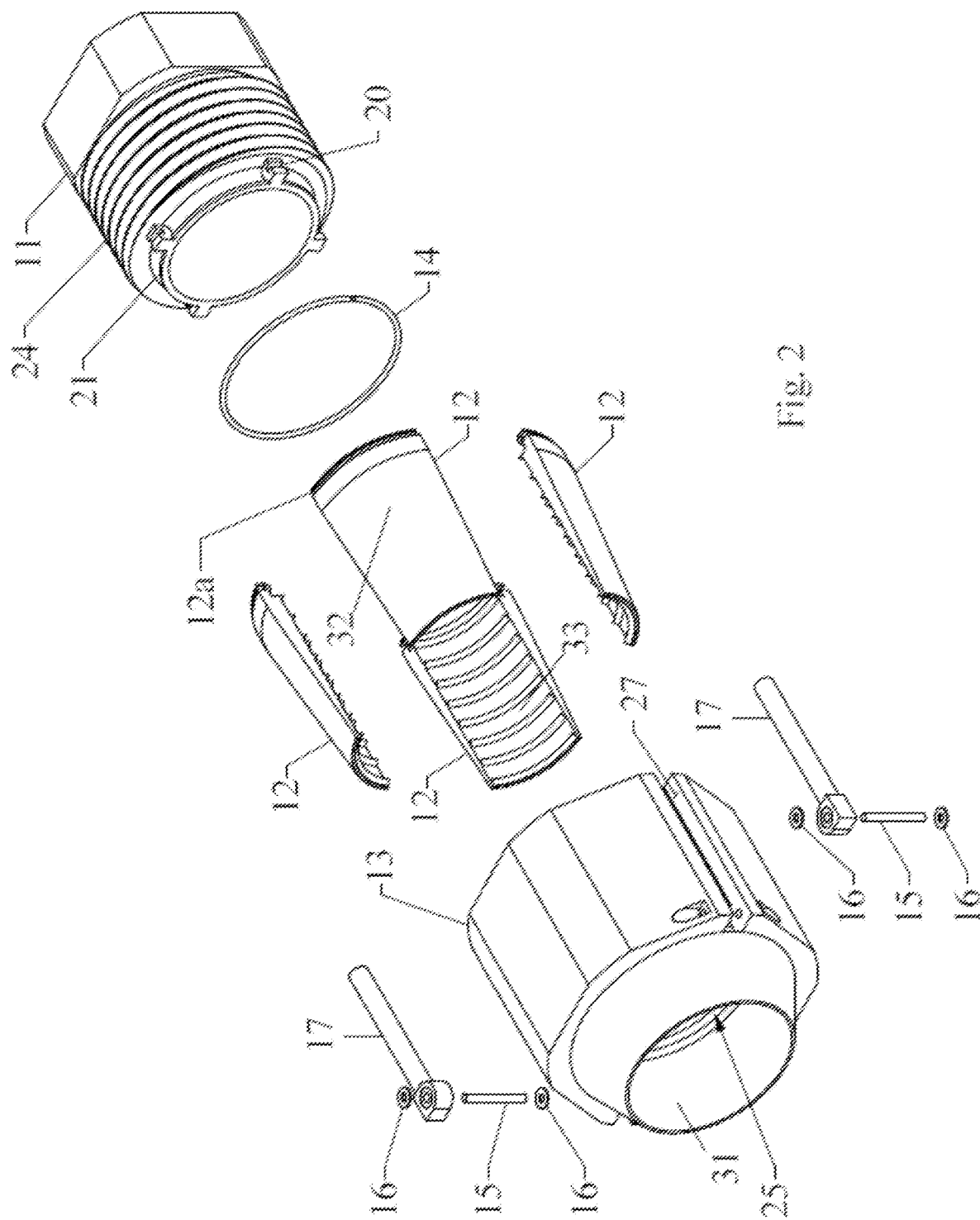
FIG. 2 is an exploded view of the components of the quick connect/disconnect system of the invention.
Figure 13:
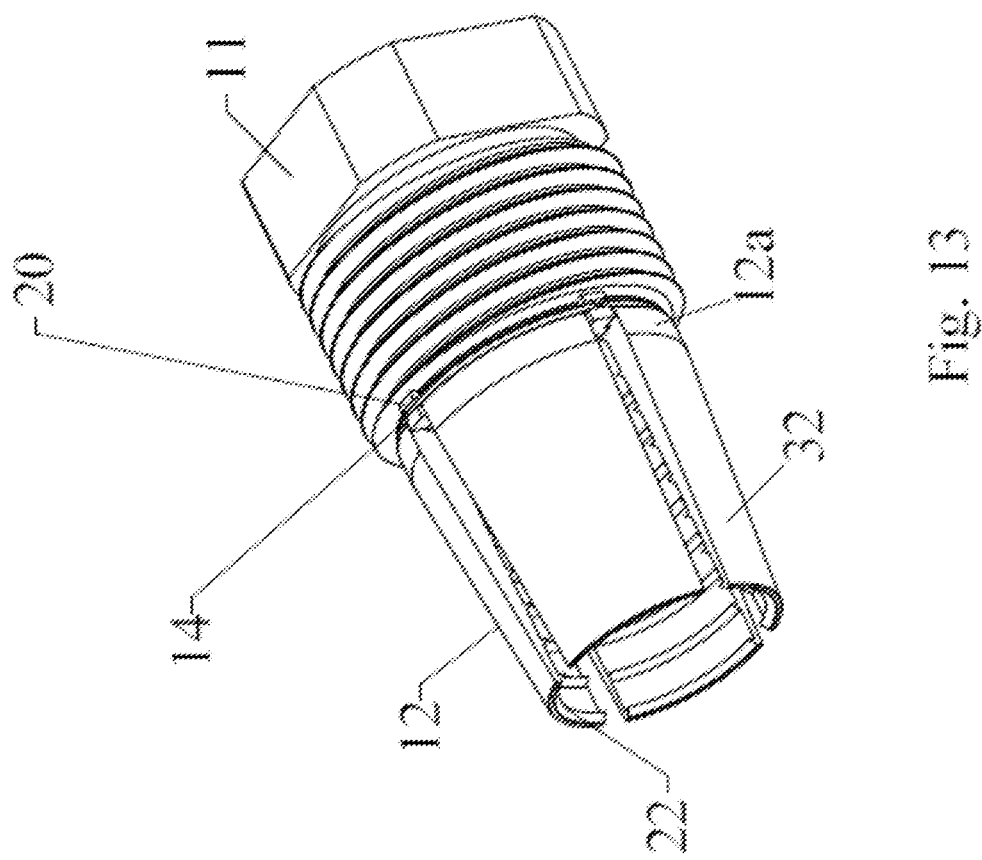
FIG. 13 shows how the leaves are positioned when mounted on the compression body, in the compressed position.
Figure 14:
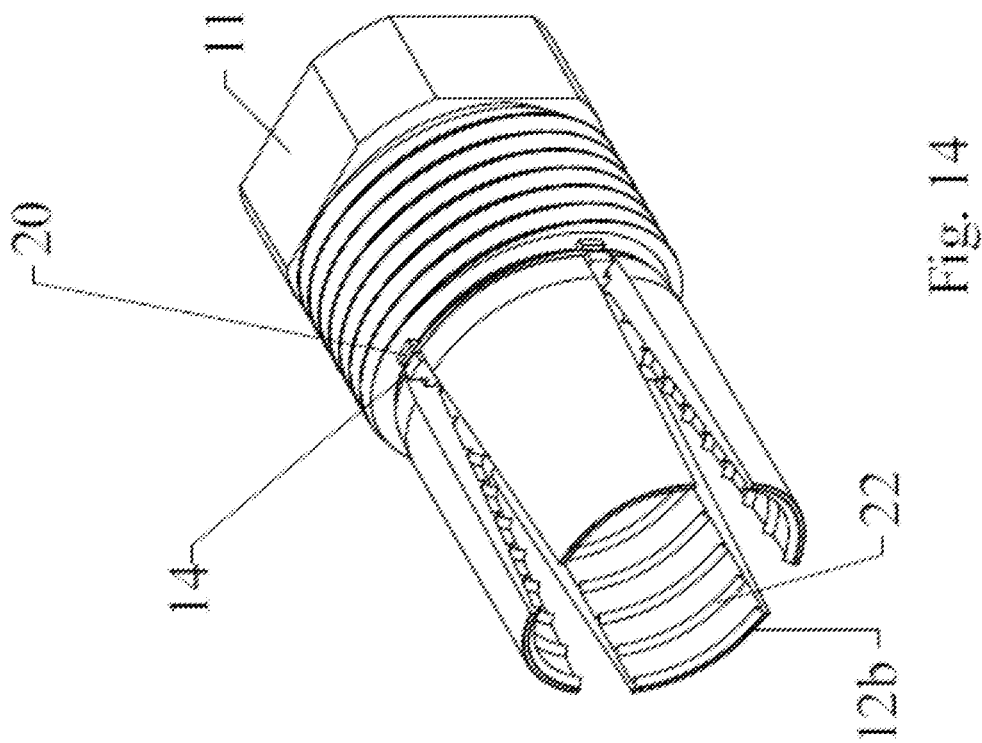
FIG. 14 shows the leaves as mounted on the compression body in the expanded position.

An exploded view of the system is shown in FIG. 2. The compression body 11 holds the assembly comprising a plurality of plates or leaves 12. Each of leaves 12 are of an arcuate, tapered design and have a first end 12a adapted to be mounted on the face 21 of the body 11, and a second end or body 12b extending therefrom. A snap ring 14 is held in slots 20, which when assembled is outboard of each leaf 12. The snap ring 14 loosely holds each leaf 12 in a longitudinal position roughly parallel to the center line 30 of the body 11. This facilitates engagement of an outer plate surface 32 of the leaves 12 with an inner nut surface 31 of the compression lock nut 13 (shown in FIG. 10).

Each leaf 12 includes an inner plate surface 33 having a plurality of raised ribs 22 which engage the first conduit 1 (outer surface thereof) when the lock nut 13 is tightened onto the compression body 11. An outer surface 26 of the compression body 11 has a mating portion 24 which is threaded for receiving mated threads 25 (on nut inner surface 31 of lock nut 13, see FIGS. 2 and 10). The dye pins 15 are each mounted on a swivel post 17 and held in place by washers 16. A swivel post groove 27 is provided for housing the dye pins when not used to tighten or loosen the assembly. FIGS. 3-9 show the assembly from various angles.

A plurality of projecting circular rings 23 can be located on the first receptacle 28 and adapted to engage and even penetrate the conduit 1 (see FIG. 12) for enhancing the coupling and sealing between the compression body 11 and the conduit 1.

FIGS. 10-12 show the assembled system with conduit ends 1 and 2 held in position by the compression body 11 and the compression lock nut 13, with the leaves 12 engaging the conduit 1 (enlarged for clarity in FIGS. 11 and 12). As there shown, ribs 22 are of triangular cross-section, creating a sharp edge 22a at the free end to embed them in the conduit 1, increasing the stability of the compression system. In addition, where the compression body 11 has two circular rings 23 engaging the first conduit 1, this further increases the stability of the assembled system. The compression body 11 has a second receptacle 29 configured for the second conduit 2 to mate therewith.

While certain embodiments and features of the invention have been shown and described, it should be understood the invention encompasses all modifications and enhancement within the scope and spirit of the following claims.

The invention claimed is:

1. A connector system for connecting two conduit ends together, the connector system comprising:
a compression body having an outer surface and an inner surface, wherein the inner surface defines a first receptacle for directly engaging a first conduit and a second receptacle for directly engaging a second conduit;
a compression lock nut adapted to be secured to the outer surface of the compression body;
a set of compression plates configured to be positioned proximate the compression body and the compression lock nut, each of the set of compression plates having a respective first plate end movably secured to the compression body, and a respective plate body extending from the compression body having an outer plate surface to engage the compression lock nut, and an inner plate surface to engage the first conduit; and
a plurality of receptacles disposed around the compression body, and a limiting element disposed in each of the plurality of receptacles, the limiting element configured to retain each of the set of compression plates in engagement with the compression body,
wherein the compression lock nut is adapted for being moved toward the compression body and for compressing the set of compression plates into contact with the first conduit,
wherein each of the set of compression plates are free to move relative to one another, and
wherein each of the set of compression plates comprise an arcuate shape and is movable toward and away from a center axis of the compression body.

2. The connector system of claim 1, wherein the limiting element comprises a ring-shaped member.

3. The connector system of claim 1, wherein each of the set of compression plates comprise a respective plurality of ribs on the inner plate surface.

4. The connector system of claim 1, the system further comprising a threaded outer body portion on the compression body and a mated threaded portion on an inner periphery of the compression lock nut, whereby the compression lock nut can be tightened or loosened relative to the compression body.

5. The connector system of claim 1, further comprising a threaded outer body portion on the compression body and a mated threaded portion on an inner periphery of the compression lock nut, whereby the compression lock nut can be tightened or loosened relative to the compression body, and wherein the compression lock nut comprises a movable handle adapted to be stowed in the compression lock nut, and the movable handle is movable between a stowed position and an operating position.

6. The connector system of claim 5, wherein the compression lock nut includes a nesting component for securing the movable handle in the stowed position.

7. The connector system of claim 6, wherein the nesting component comprises a groove located in the compression lock nut and a swivel mount permitting rotation of the movable handle into and out of the groove.

8. The connector system of claim 1, wherein the compression body further comprises an at least one continuous ring disposed in the first receptacle, the at least one continuous ring configured to facilitate a seal between the compression body and the first conduit.

9. A connector system for connecting two conduit ends together, the connector system comprising:
a compression body having an outer surface and an inner surface, wherein the inner surface is configured with a first receptacle for directly engaging a first conduit;
a compression lock nut engaged to the outer surface of the compression body;
a set of compression plates positioned proximate the compression body and the compression lock nut, each of the set of compression plates having a respective first plate end movably secured to the compression body, and a respective plate body extending from the compression body having an outer plate surface to engage the compression lock nut, and an inner plate surface to engage the first conduit;
a plurality of receptacles disposed around the compression body; and
a limiting element disposed in each of the plurality of receptacles,
wherein the compression lock nut is adapted for compressing the compression plates into contact with the first conduit,
wherein the compression body further comprises an at least one continuous ring disposed in the first receptacle,
wherein the inner surface of the compression body is configured with a second receptacle for directly engaging a second conduit,
wherein when the connector system is in an untightened position, each of the set of compression plates is free to move relative to one another, and also each of the set of compression plates is movable toward and away from a center axis of the compression body,
wherein the limiting element is configured to retain each of the set of compression plates in engagement with the compression body,
and wherein the at least one continuous ring facilitates sealing between the compression body and the first conduit.

10. The connector system of claim 9, wherein the limiting element comprises a ring-shaped member.

11. The connector system of claim 9, wherein each of the set of compression plates comprise a respective plurality of ribs on the inner plate surface.

12. The connector system of claim 11, the system further comprising a threaded outer body portion on the compression body and a mated threaded portion on an inner periphery of the compression lock nut.

13. The connector system of claim 9, the system further comprising a threaded outer body portion on the compression body and a mated threaded portion on an inner periphery of the compression lock nut, whereby the compression lock nut can be tightened or loosened relative to the compression body, and wherein the compression lock nut comprises a movable handle adapted to be stowed in the compression lock nut in a stowed position.

14. A connector system for connecting two conduit ends together, the connector system comprising:
a compression body having an outer surface and an inner surface, wherein the inner surface defines a first receptacle for directly engaging a first conduit and a second receptacle for directly engaging a second conduit, and wherein the outer surface comprises a threaded outer body portion;

a compression lock nut adapted to be secured to the outer surface of the compression body, a mated threaded portion on an inner periphery of the compression lock nut;

a set of compression plates configured to be positioned proximate the compression body and the compression lock nut, each of the set of compression plates having a respective first plate end movably secured to the compression body, and a respective plate body extending from the compression body having an outer plate surface to engage the compression lock nut, and an inner plate surface to engage the first conduit, wherein the compression lock nut can be tightened or loosened relative to the compression body, wherein the compression lock nut comprises a movable handle adapted to be stowed in the compression lock nut, and the movable handle is movable between a stowed position and an operating position, and wherein the compression lock nut is adapted for being moved toward the compression body and for compressing the set of compression plates into contact with the first conduit.

15. The connector system of claim 14, wherein each of the set of compression plates is movable toward and away from a center axis of the compression body.

16. The connector system of claim 14, the system further comprising: a plurality of receptacles disposed around the compression body, and a limiting element disposed in each of the plurality of receptacles, the limiting element configured to retain each of the set of compression plates in engagement with the compression body.

17. The connector system of claim 16, wherein the limiting element comprises a ring-shaped member.

* * * * *